United States Patent
Pike et al.

(10) Patent No.: US 9,773,267 B2
(45) Date of Patent: *Sep. 26, 2017

(54) PRESENCE AND PROXIMITY DRIVEN FILTERING OF APPLICATIONS AND MEDIA CONTENT

(71) Applicant: CITIZEN, INC., Portland, OR (US)

(72) Inventors: Sce Pike, Portland, OR (US); Quinn Simpson, Portland, OR (US); Kevin Gask, Portland, OR (US)

(73) Assignee: CITIZEN, INC., Portland, OR (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/082,208

(22) Filed: Mar. 28, 2016

(65) Prior Publication Data

US 2016/0275579 A1    Sep. 22, 2016

Related U.S. Application Data

(63) Continuation of application No. 14/107,229, filed on Dec. 16, 2013, now Pat. No. 9,299,102.

(60) Provisional application No. 61/737,227, filed on Dec. 14, 2012.

(51) Int. Cl.
| | | |
|---|---|---|
| G06F 17/30 | (2006.01) | |
| G06Q 30/06 | (2012.01) | |
| H04W 4/02 | (2009.01) | |

(52) U.S. Cl.
CPC ... *G06Q 30/0607* (2013.01); *G06F 17/30241* (2013.01); *G06Q 30/0641* (2013.01); *H04W 4/023* (2013.01)

(58) Field of Classification Search
CPC .... G06Q 30/0641; H04W 64/00; H04W 4/02; H04L 29/08657; G01S 5/0252; G01S 5/02

See application file for complete search history.

(56) References Cited

U.S. PATENT DOCUMENTS

| | | | |
|---|---|---|---|
| 9,299,102 B1 * | 3/2016 | Pike | G06Q 30/0641 |
| 2004/0009750 A1 * | 1/2004 | Beros | H04L 29/06 455/41.2 |
| 2006/0099967 A1 * | 5/2006 | Colvin | H04M 1/72572 455/456.4 |
| 2010/0262554 A1 * | 10/2010 | Elliott | G01C 21/20 705/323 |
| 2011/0201358 A1 * | 8/2011 | Karaoguz | H04W 4/02 455/456.3 |
| 2011/0231273 A1 * | 9/2011 | Buchheit | G06Q 20/12 705/26.1 |
| 2012/0296728 A1 * | 11/2012 | Humphreys | G06Q 30/0231 705/14.33 |

* cited by examiner

*Primary Examiner* — Kashif Siddiqui
(74) *Attorney, Agent, or Firm* — Michael J. Andri

(57) ABSTRACT

Access to certain application programs and/or media content items at or from an online storefront are granted or denied for a requesting computing device based on whether a subject computing device is present at or within a threshold proximity to a reference computing device or a reference location. The requesting computing device may include the reference computing device or another computing device.

20 Claims, 4 Drawing Sheets

PRESENCE AND PROXIMITY DRIVEN FILTERING OF APPLICATIONS AND MEDIA CONTENT

CROSS REFERENCE TO RELATED APPLICATIONS

This application is a continuation application of and claims priority to U.S. patent application Ser. No. 14/107,229, titled PRESENCE AND PROXIMITY DRIVEN FILTERING OF APPLICATIONS AND MEDIA CONTENT, filed Dec. 13, 2013, and issuing as U.S. Pat. No. 9,299,102 on Mar. 28, 2016, which is a non-provisional application of and claims priority to U.S. provisional patent application No. 61/737,227, titled PROXIMITY DRIVEN APPLICATION FILTERING, filed Dec. 14, 2012, the entire contents of each of these applications are incorporated herein by reference for all purposes.

BACKGROUND

Application programs expand or otherwise augment the functionality of a computing device. In one example, users may access application programs via a communications network (e.g., the Internet) by downloading application programs from an online storefront hosted by a remote server system. Once downloaded, application programs may be installed and executed at the computing device.

Typically, online storefronts enable users to purchase applications in which the user conducts a financial transaction with the online storefront prior to downloading and installing the desired application. However, some online storefronts may also offer certain application programs to users free of charge. In either case, users are typically required to register with the online storefront in which a user account is created and the user's financial account information is stored in association with the user account for subsequent transactions, even if some applications programs are offered free of charge. Non-limiting examples of online storefronts for application programs include the current Apple iTunes brand and the Google Android brand of online application storefronts.

Media content audio and/or video content items such as music, movies, television programs, and podcasts, as well as textual content items such as electronic books or journals, may also be accessed by users via a communications network by downloading or streaming the media content from an online storefront hosted by a remote server system. Some online media storefronts (as well as some online application storefronts), such as e.g., the current Apple iTunes brand or Amazon brand of online media storefronts, offer media content items on an individual pay per access basis, while online media subscription services, such as e.g., the current Netflix brand or the Amazon Prime brand of media stores, typically offer unlimited access to media content items of their online media library upon payment of a periodic subscription fee. As with some application stores, some online media storefronts may also offer some or all of their content free of charge, but typically require the user to register with the online media storefront by creating a user account and providing financial account information that is stored in association with the user account for subsequent purchases and/or downloads of media content. In each of the above examples, application programs and/or media content items are not controlled by or are not under the ownership of the end user until the user initiates a purchase or other transaction involving a desired application program and/or media content item via a communications network from the online storefront. This aspect of online storefronts differs from network or cloud-based storage of a user's files or a user's media content items in which the user has already acquired control and/or ownership of such files or media content items.

SUMMARY

Access to certain application programs and/or media content items at or from an online storefront are granted or denied for a requesting computing device based on whether a subject computing device is present at or within a threshold proximity to a reference computing device or a reference location.

In one example, a server system hosting the online storefront associates a subject computing device with a reference computing device or a reference location in a user account. A request initiated by a requesting computing device to the online storefront is received via a communications network. The requesting computing device includes the reference computing device or another computing device, such as e.g., a set-top box. Presence of the subject computing device at the reference computing device or reference location is detected over one or more wireless communication links and/or a proximity of the subject computing device to the reference computing device or the reference location is detected over one or more wireless communication links. A reference location may take the form of a reference geographic location or a reference network location (e.g., an IP address, access point identifier, or other suitable network identifier).

Responsive to a lack of presence of the subject computing device at the reference computing device or the reference location, and/or the proximity of the subject computing device to the reference computing device or the reference location being greater than a threshold, access is granted to only a limited set of application programs and/or media content items at or from the online storefront, while access to other application programs and/or media content items at or from the online storefront is denied for the requesting computing device. The limited set of application programs and/or media content items may include zero, one, or more application programs and/or media content items. Filtering or exclusion of these items may be based on third-party ratings or categorizations, such as those involving suitability for users of certain age groups.

However, responsive to presence of the subject computing device at the reference computing device or reference geographic location and/or the proximity of the subject computing device to the reference computing device or reference location being less than the threshold, access is granted to the limited set of application programs and/or media content items at or from the online storefront, and access is granted to the other application programs and/or media content items at or from the online storefront for the requesting computing device.

DETAILED DESCRIPTION

The present disclosure utilizes considerations of a subject computing device's presence at and/or proximity to a reference computing device or a reference geographic location for determining whether to grant or deny a requesting computing device access to application programs and/or media content items that may be otherwise acquired from an online storefront.

A primary account user may define filters for particular categories of application programs and/or media content items that will be granted or denied access based on a determination of presence or proximity. These categories are often predefined at and supplied by the online storefront by one or more of the content provider, third-party rating associations such as the Motion Picture Association of America MPAA or the Entertainment Software Rating Board (ESRB), the online storefront operator, and/or other consumers of the online storefront without necessarily requiring the involvement of an individual user or consumer.

The requesting computing device, operated by a user acting in the role of a consumer that desires to acquire application programs and/or media content items from the online storefront, may include the reference computing device or another computing device. In one example scenario, the subject computing device takes the form of a mobile computing device carried by a primary account user (e.g., a parent or guardian) that desires to filter application programs and/or media content items that are made available for purchase or acquisition at or from the online storefront by an associated secondary account user (e.g., a child) that is operating the requesting computing device or is associated with the reference computing device.

Figure 1:
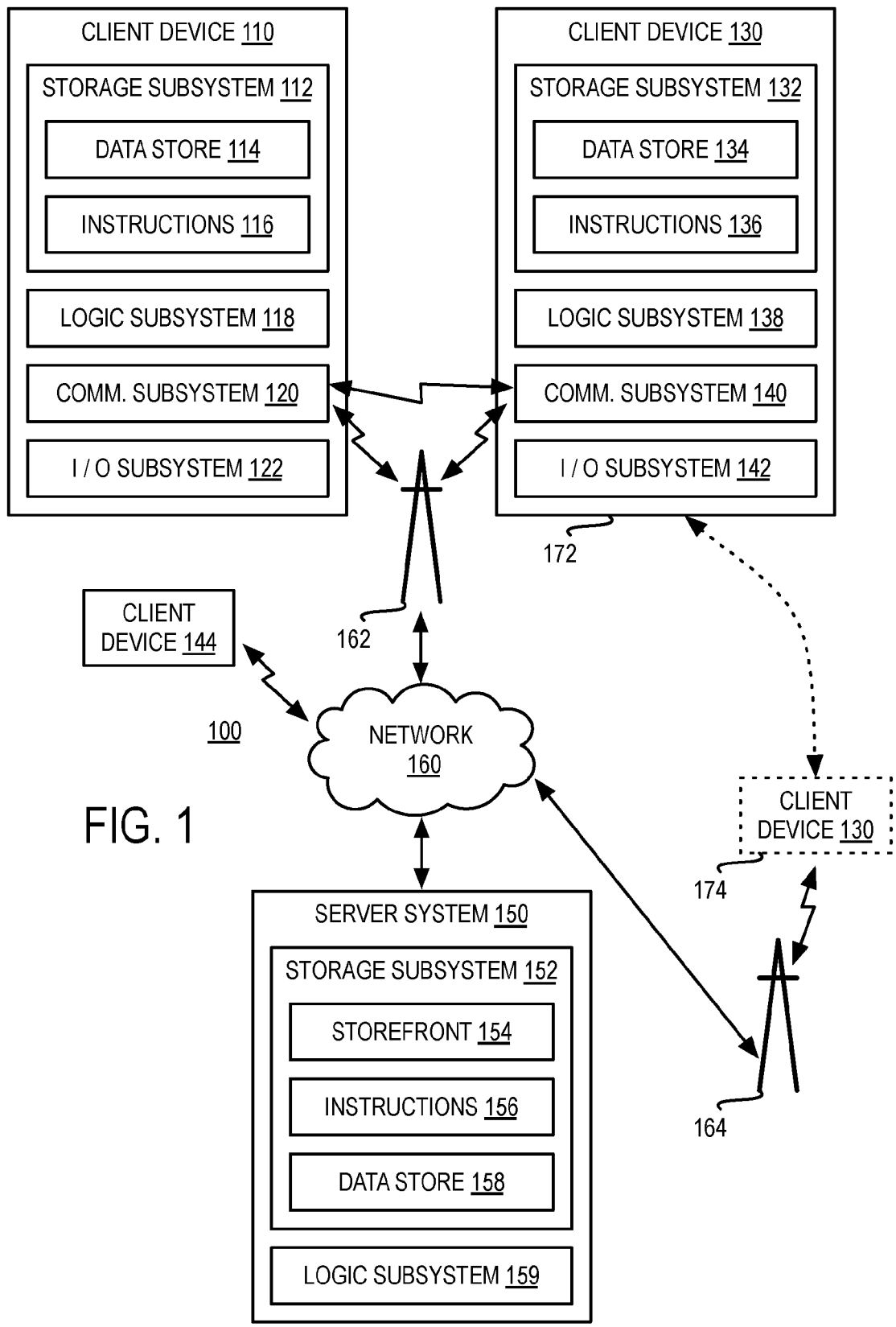
FIG. 1 is a schematic diagram depicting an example computing system according to a disclosed embodiment.

FIG. 1 is a schematic diagram depicting an example computing system 100. Within computing system 100, computing devices in the form of client devices 110, 130, and 144 obtain network connectivity with a communications network 160 via one or more access points, such as example access point 162. Connectivity between network 160 and client devices 110, 130, and 144 may include wireless and/or wired communication links. Client devices 110, 130, and 144 may additionally communicate directly with each other via a near-field wireless communications protocols such as Bluetooth and/or personal area network protocols such as Wi-Fi, for example.

Client devices 110, 130, and 144 may communicate over communications network 160 with a remote server system 150 that hosts an online application program and/or media content storefront 154 (hereafter "online storefront") from which client devices may download and install application programs, or download or stream media content items. Online storefront 154 provides a network-accessible platform hosted by one or more servers of a server system from which application programs and/or media content items may be purchased or otherwise acquired by end users acting as consumers. In this context, the term "purchase" includes pay per access for individual items and includes subscriptions paid by users to access a broader range of items from storefront 154. The term "purchase" may also be used in some contexts with reference to a user initiating acquisition of and/or access to an application program or media content item over which that user initially does not retain ownership or control even if at least some items within the online storefront are offered free of charge. These contexts include libraries that require the registration of a user in which the user creates a user account with the storefront prior to obtaining access to application programs and/or media content items, and typically provides financial account information (e.g., credit card or bank account information) that is used to facilitate subsequent transactions.

Access to application programs and/or media content items from online storefront 154 by a requesting computing device (e.g., a reference computing device such as client device 110 or by a third-party computing device such as client device 144) may be limited responsive to conditions or scenarios in which the subject computing device (e.g., client device 130) is not present at or located within a threshold proximity to a reference computing device (e.g., client device 110) or a reference location.

The reference location may include a user-defined geographic location having a fixed position or a transient position. Non-limiting examples include a geographic location of the reference computing device, a physical mailing address or a portion thereof, a geographic coordinate value, a set of values defining a geographic range, etc. The reference location may include a user-defined network location having a fixed or transient network location value. Non-limiting examples include an IP address or network identifier of the reference computing device or access point (e.g., for 162) through which network connectivity is obtained.

Client devices 110 and 130 may be associated with each other to enable the filtering of storefront 154 based on an indication presence or proximity between these devices. One example technique for associating two or more client devices includes device pairing. However, other suitable techniques may be used to associate two or more client devices as will be described in further detail herein.

As an illustrative example, client device 130, if located at position 172, may be determined to be present at or within a threshold proximity to client device 110, enabling a requesting computing device (e.g., client device 110 or client device 144) to access a broader range and/or a different selection of application programs and/or media content items from online storefront 154 as compared to a scenario where client device 130 is instead located at position 174. For example, at position 174, client device 130 may obtain network connectivity with communications network 160 via a different access point 164 than client device 110, and may be determined to be outside the threshold proximity. A variety of techniques will be described in further detail herein for determining presence or proximity, and whether filtering should be applied to limit access to application programs and/or media content items responsive thereto.

In one example scenario, client device 144 may take the form of a set-top box located within a home, client device 110 may take the form of a computing device operated by a child, and 130 may take the form of mobile computing devices operated by a parent of the child. In another example scenario, client device 144 may be omitted, client device 130 may take the form of a mobile computing device, and client device 110 may take the form of a mobile computing device or a non-mobile computing device (e.g., a desktop computer or a set-top box). It will be understood that these example scenarios are to be considered non-limiting.

Figure 2:
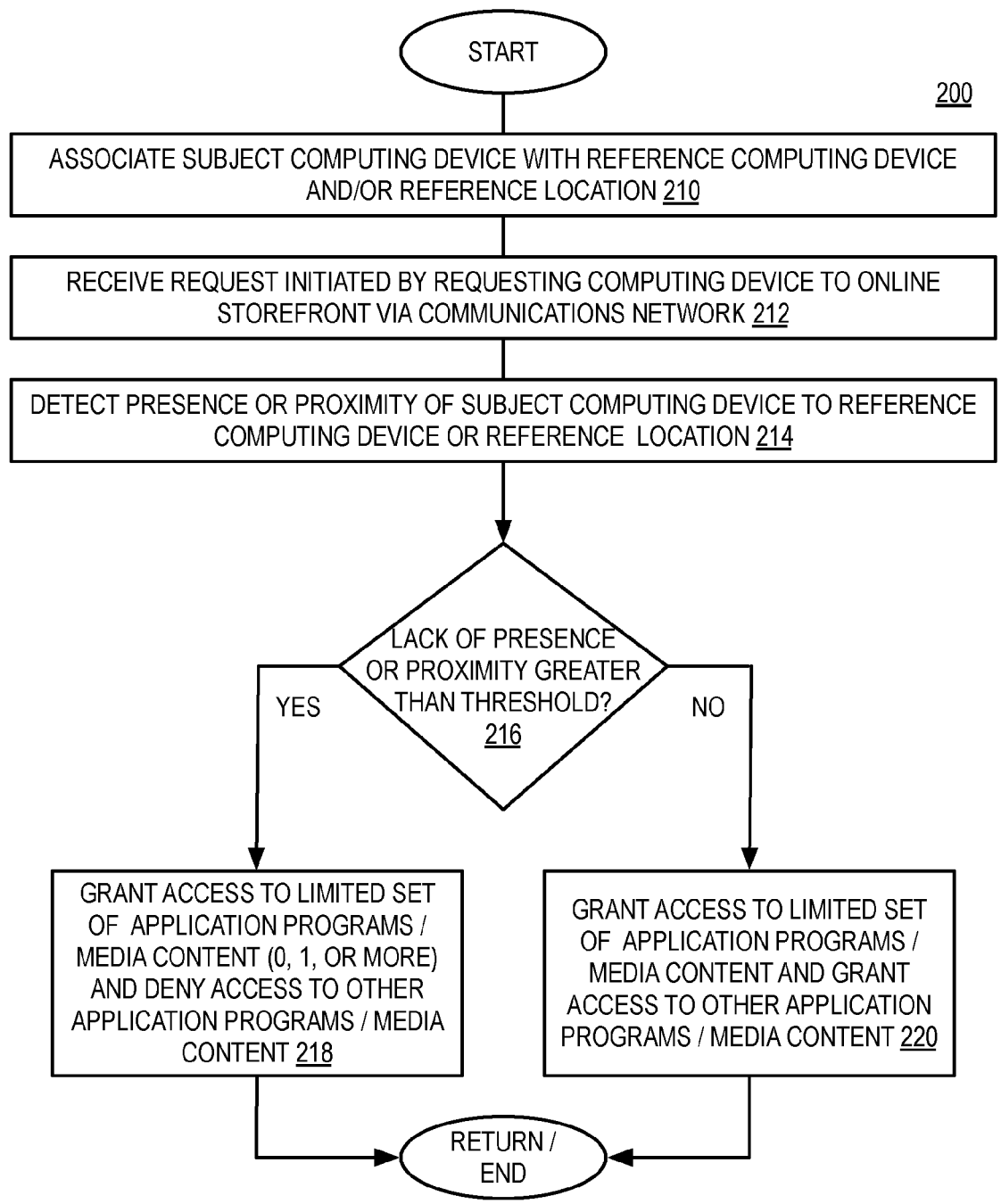
FIG. 2 is a flow diagram depicting an example method for controlling access to application programs and/or media content items according to a disclosed embodiment.

FIG. 2 is a flow diagram depicting an example method 200 for controlling access to application programs and/or media content items from an online storefront. In at least some implementations, method 200 may be performed, at least in part, by a server system hosting the online storefront accessible to user operated computing devices via a communications network. In another example implementation, method 200 may be performed, at least in part, by a client device operated by an end user. Still other implementations may include cooperation between a server system hosting online storefront, and one or more user operated client devices to perform aspects of method 200 or portions thereof.

At 210, the method includes associating a subject computing device with a reference computing device or a reference location. An association between a subject computing device and a reference computing device or a reference location may be user-defined in at least some implementations. In one example, the user that defines this association may be the primary account holder, administrator user, or the higher or highest level user in a hierarchical user account structure. This user may be referred to herein as the "primary user" or the person holding the "primary user account". The hierarchical user account structure may also include one or more secondary, guest, or child user accounts that are defined in a lower or more subservient position within the hierarchical structure relative to the primary user. This user may be referred to herein as the "secondary user" or the person holding the "secondary user account". As one example, a primary user that defines the association may be the parent of a child over which the parent desires to exercise control of application programs or media content items accessible to that child at or from the online storefront.

Associations between two or more computing devices and/or users may be initiated or otherwise established by a user or users of the first and second computing devices. As one example, device pairing may be used to associate two or more computing devices and/or users. Device pairing may include a user selecting the device or devices to be paired from a menu of a graphical user interface, by bringing such devices into physical contact (including contemporaneous accelerometer measurements detected by each of the devices) or wireless near-field proximity to each other, and/or may be based on device ownership and/or user registration in which two or more devices are associated with a user account structure involving multiple user accounts, an individual user account, a user profile, or a user identifier (e.g., an email address). It will be understood that authentication of users and/or computing devices may be used to identify and distinguish individual users and/or computing devices from each other in an ecosystem containing large numbers of users and computing devices.

Within a computing system, each computing device may be represented and/or identified by an identifier that is sufficiently unique within the domain to enable devices to be distinguished from each other. The identifier may take the form of or may be based on a hardware element identifier of the device, a software identifier for software or firmware installed on the device, a communication session identifier (including authenticated sessions based on login credentials) identifying the device communicating over a communications network, or a combination thereof. Identifiers of respective devices may be stored in association with each other within a database system residing at one or more of the devices, or at a remote server system.

In the context of a server system implementation of method 200, the server system may receive an indication of two or more associated devices over the communications network. The server system may store the device identifiers in a database system from which the association may be referenced for subsequent sessions to maintain the associated state between two or more devices.

Within the context of user-defined locations, a user may submit a location definition or location information via a graphical user interface. In some examples, a geographic location or network location of the user may be detected based on the current geographic location of the user's computing device. The computing device may communicate the current location and/or user-defined location information to a server system via a communications network. The computing device and/or server system may store this location information in a database for use as the reference location for that user and/or device.

At 212, the method includes receiving a request initiated by a requesting computing device to the online storefront via the communications network. The requesting computing device may include the reference computing device or another computing device. The request may include a request to browse application programs and/or media content items of the online storefront, a request to purchase or download an application program or a media content items from the online storefront, or other type of request for information related to application programs and/or media content items of the online storefront. The request may be attributed to a particular user account by authenticating the user and/or device at the server system prior to processing the request or as part of the request. As one example, the online storefront may prompt the user to provide login credentials by which the online storefront authenticates that user, and then retrieves, from the user account associated with that user, the settings placed upon that user account.

At 214, the method includes detecting presence of a subject computing device and/or a proximity of the subject computing device to the reference computing device or reference location. Presence and/or proximity may be detected in a variety of ways depending on implementation.

In some examples, detecting presence and/or proximity may be performed over one or more wireless communication links, including through use of geo-location information obtained from satellites and/or terrestrial basestations, communication sessions existing between a computing device and a wireless access point, and/or geo-location information communicated by the subject and/or reference computing devices over the one or more wireless communication links. Proximity may be indicated in some examples by presence of the subject computing device at a geographic location or network location, or by a physical geographic distance (e.g., feet, miles, etc.) existing between the subject and reference computing devices or between the subject computing device and the reference geographic location. Presence and/or proximity may also be detected by determining whether the requesting computing device and the subject computing device are accessing a communications network via the same access point (e.g., based on IP address or other indication) or a geographically proximate access point. Detection of presence or proximity may be initiated, in some examples, responsive to receiving an access request from a requesting computing device, such as described at operation 212.

As one example, presence and/or proximity of the subject computing device to the reference computing device may be detected by receiving the request initiated by the requesting computing device via an access point (e.g., a wired or wireless access point) of the communications network, and detecting presence of the subject computing device at the access point or within communication range of the access point or a nearby access point (e.g., within wireless communication range of a nearby wireless access point). The proximity between the subject computing device and the reference computing device or reference geographic location may be determined to be greater than the threshold if the subject computing device is not detected within communication range of the access point. The proximity between the subject computing device and the reference computing device or reference geographic location may be determined to be less than the threshold if the second computing device is detected within wireless communication range of the access point.

As another example, proximity of the first computing device to the second computing device may be detected by obtaining first geo-location information for the first computing device, obtaining second geo-location information for the second computing device, and comparing the first geo-location information and the second geo-location information to determine a geographic proximity between the devices. In this example, the threshold may include a geographic distance value (e.g., 10 feet, 30 feet, 100 feet, 1 mile, or other suitable value), and may be user defined.

As another example, proximity of the first computing device to the second computing device may be detected by obtaining first geo-location information for one of the first computing device or the second computing device, receiving communications from the other of the first computing device or the second computing device via an access point (e.g., wired or wireless access point), retrieving second geo-location information for the access point, and comparing the first geo-location information and the second geo-location information to determine a geographic proximity. In this example, the threshold may include a geographic distance value, such as previously described.

As another example, proximity of the first computing device to the second computing device may be detected by receiving communications from the first computing device via a wired or wireless access point, and receiving communications from the second computing device via the same access point or a different wired or wireless access point. In this example, the proximity detected between the first computing device second computing device may be defined as being greater than the threshold if the communications received from the second computing device are not received via the same access point as the first computing device, or if the communications are received from the second computing device via the different access point.

As another example, proximity of the first computing device to the second computing device may be detected by initiating a request for the location of the second computing device or initiating a communication to the second computing device, receiving a response to the request for the location or the communication that indicates a geographic location of the second computing device, and using geographic location to determine proximity of the second computing device to the first computing device.

As yet another example, presence or proximity of the first computing device to the second computing device may be detected by at least one of the first computing device and/or the second computing device via a direct wireless link established, existing, or measured between the devices (e.g., via a near-field wireless protocol such as Bluetooth). An indication of this detected presence/proximity or a lack thereof may be reported to the server system by at least one of the first computing device and/or the second computing device. The server system receives the indication of presence/proximity or an indication of a lack thereof. In at least some implementations, the other device that is not requesting access to a storefront or a device designated as the parent device (as described in greater detail with reference to FIG. 5) may be required to transmit the indication of presence/proximity for the threshold proximity condition or presence determination to be satisfied. In another implementation, the device requesting access to the storefront or both devices may be required to transmit the indication of presence/proximity for the threshold condition to be satisfied.

At 216, the method includes, responsive to a lack of presence of the subject computing device at the reference computing device or reference location, and/or proximity being detected between the subject computing device and the reference computing device or reference geographic location being greater than a threshold, granting access to a limited set of application programs and/or media content items of the online storefront and denying access to other application programs and/or media content items of the online storefront for the requesting computing device. The limited set of application programs and/or media content items may include zero, one, or more items, and the other application programs and/or media content items for which access is denied may include zero, one, or more items.

In at least some implementations, denying access to application programs and/or media content items may be performed at the client-side by the requesting computing device executing client-side software and/or may be performed at the server-side by the server system executing server-side software. Such server-side software may take the form of a component of the software that defines the online storefront's access control module. Such client-side software may take the form of a component of a special-purpose browser program used by the client device to access and interact with the online storefront.

The method at 216 may further include applying a filter at or to the online storefront to obtain the limited set of application programs and/or media content items to which the requesting computing device is granted access. The filter may be at least partially defined by a user (e.g., the primary user) associated with a user account, the subject computing device, and/or the reference computing device. Such associations may be maintained in a database of the server system. As a non-limiting example, a parent may define acceptable types or classes of application programs and/or media content items that can and cannot be accessed by if the proximity threshold is not satisfied or if presence has not been detected.

At 218, the method includes, responsive to detecting presence or responsive to proximity detected between the subject computing device and the reference computing device or reference location being less than the threshold, granting access to the limited set of application programs and/or media content items, and also granting access to the other application programs and/or media content items of the online storefront for the requesting computing device. Granting access to application programs and/or media content items may be performed at the client-side by the first computing device executing client-side software and/or may be performed at the server-side by the server system executing server-side software, for example, as previously described with respect to filtering at 216.

Granting access may include enabling the requesting computing device to download an application program and/or download or stream a media content item from the online storefront via the communications network. Denying access may include blocking download or streaming of the application program and/or media content item by the requesting computing device from the online storefront. Alternatively or additionally, denying access may include enabling the requesting computing device to download the application program and/or download or stream the media content item from the storefront via the communications network, but denying installation and/or launch of the application program or playback of the media content item at the requesting computing device.

Installation and/or launch of the application program or playback of the media content item may be initiated and/or enabled at the requesting computing device upon the subject computing device entering within the proximity threshold of the reference computing device or reference location based on an update to the detected proximity between the subject computing device and the reference computing device or reference location. In client-side implementations where access to an application program and/or media content item is denied at the requesting computing device by client-side software executed by that device, an indication of proximity may not be transmitted to the server system. Instead, installation and/or launch of the application program, or streaming or playback of the media content item by the requesting computing device may be denied by the client-side software at least until sufficient proximity or presence is detected.

In other words, within at least some of the above examples, application programs and/or media content items not contained within the limited set may be downloaded to or streamed and buffered at the requesting computing device even if the subject computing device is not within the threshold proximity to the reference computing device or reference location, but may be denied launch, installation, and/or playback until the subject computing device is located within the threshold proximity.

From the perspective of a client device, aspects of method 200 may be implemented by the first computing device storing an association between the first computing device and a second computing device in a data store of the first computing device. The first computing device may transmit a request from the first computing device to access a storefront hosted by a server system via a communications network. The request may indicate whether presence of the second computing device (i.e., the associated device) has been detected via a direct near-field wireless link between the first computing device and the second computing device. The first computing device may then receive a response from the server system that includes application program and/or media content information of the storefront that can be rendered to a graphical display of the first computing device. This application program information may include elements of an application and/or media content store, for example. If the request did not indicate presence of the second computing device, the application program information may include a limited set of application programs and/or media content items of the storefront. If the request indicated presence of the second computing device, the application program and/or media content information may include an expanded set of application programs and/or media content items of the storefront. The rendered information may enable a user to select an application program and/or media content item for purchase and/or download/ streaming. Storing the association at the first computing device, the second computing device, and/or at the server system may be performed responsive to a user initiating a device association operation at the first computing device and/or in combination with an access request for the storefront. Transmitting the request may be performed responsive to a user launching a browser application at the first computing device for accessing the storefront hosted at the server system.

Proximity and/or presence may be time dependent. For example, proximity detected between the subject computing device and the reference computing device or reference location may be determined to be greater than the threshold if the subject computing device is detected within wireless communication range of a wireless access point or reference location (or within wireless range to each other) outside of a threshold time period (e.g., prior to) to receiving the request or other communication from the requesting computing device. By contrast, proximity detected between the subject computing device and the reference computing device or reference location may be determined to be less than the threshold if the subject computing device is detected within wireless communication range of a wireless access point (or within wireless range to each other) inside the threshold time period to receiving the request or other communication from the first computing device. In at least some implementations, the server system, the reference computing device, and/or the subject computing device may periodically detect proximity and/or maintain a historical record of proximity between the subject computing device and the reference computing device and/or reference location.

As a non-limiting example, a first computing device and/or the server system may log a time at which presence of a second computing device is detected within wireless communication range of a wireless access point. The first computing device or server system may compare a time logged for the second computing device to a time that the request was initiated by or received from the first computing device. Responsive to presence of the second computing device being detected within wireless communication range of the wireless access point and a time difference between the time logged for the second computing device and the time that the request was received being greater than a threshold period, access may be granted to a limited set of application programs and/or media content items of the storefront and access may be denied to other application programs and/or media content items of the storefront for the first computing device initiating the request. Responsive to presence of the second computing device being detected within wireless communication range of the wireless access point and a time difference between the time logged for the second computing device and the time that the request was received being less than the threshold period, access may be granted to the limited set of application programs and/or media content items, and to the other application programs and/or media content items of the storefront for the first computing device initiating the request.

In at least some implementations, the server system may associate application programs and/or media content items within the online storefront with identifiers that enable filtering of applications and/or media content items based on filtering criteria. Such identifies may include ratings received from third-party sources, such as publicly recognized application program and/or media content rating agencies (e.g., the MPAA).

As one example, the limited set of application programs and/or media content items described in the previous filtering examples may be associated with a first identifier or set of identifiers, and the other application programs and/or media content items may be associated with a second identifier or set of identifiers that differ from the first identifier or set of identifiers. In at least some implementations, detection of proximity or presence of the subject computing device relative to a reference computing device or reference geographic location may be initiated only if the requesting computing device directs a request at particular application programs and/or media content items associated with a particular identifier or set of identifiers. For example, a determination of whether the subject computing device is within wireless communication range of a wireless access point or the reference computing device may be initiated only if the requesting computing device directed a request at application programs and/or media content items associated with an excluded identifier (e.g., an MPAA "R" rating or other suitable category excluded by a parent). Other forms of presence or proximity detection may be initiated responsive to requests for access to certain types of application programs and/or media content items as indicated by their respective identifiers.

In at least some implementations, responsive to a requesting computing device initiating a request to the online storefront via the communications network, the method may further include transmitting a selection of recommended and/or currently accessible application programs and/or media content items to the requesting computing device from the storefront. Recommended and/or currently accessible application programs and/or media content items may be based on presence, proximity, or lack thereof detected between the subject computing device and the reference computing device or reference location, and may be further based on a user account attributed to the request.

In some examples, the user account may include an indication of social connectivity within a social network of other user accounts that are active with respect to the online storefront. For example, a user may be notified of application programs and/or media content items purchased and/or downloaded by friends within the social network that are also currently accessible to that user based on presence or proximity of the subject computing device to a reference computing device or reference location. Hence, it will be appreciated that multiple layers of filtering may be applied to the online storefront.

Figure 3:
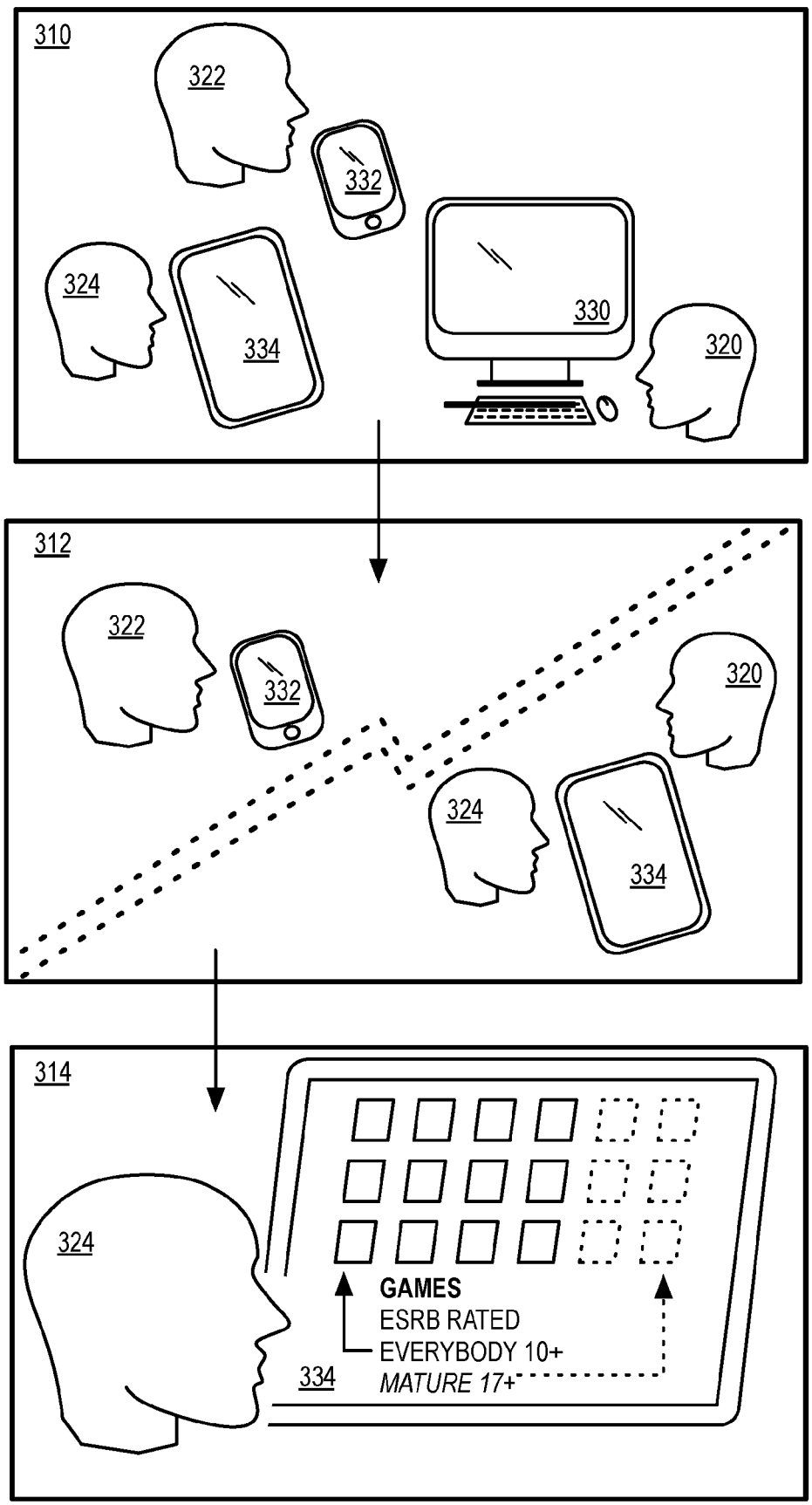
FIG. 3 is a storyboard diagram depicting an example use-scenario according to a disclosed embodiment.

FIG. 3 is a storyboard diagram depicting an example use-scenario 300. At 310, a family that includes a parent 322 and children 320 and 324 are interacting with computing devices 330, 332, and 334 within their home. Hence, devices 330, 332, and 334 are initially present at the same or similar location, and within close proximity to each other. In this example, computing device 332 is a mobile phone, device 334 is a tablet computer, and device 330 is a desktop personal computer or set-top box of a television. Computing devices 330, 332, and 334 have been associated with each other in accordance with the previously described device pairing techniques. At 312, parent 322 leaves the home with device 332 to go shopping while children 320 and 324 remain at home with device 334. At 314, child 324 is viewing a user interface of an online storefront presented by device 334. Within this user interface, game type application programs have been filtered from the selection of games as indicated by the dotted lines due to their categorization as Mature 17+ games under the ESRB rating system. By contrast, games categorized as Everybody 10+ are accessible to child 324, in which case the child may purchase, download, and install these accessible games.

While proximity between devices has been depicted in FIG. 3, proximity of device 332 carried by parent 322 to a geographic and/or network location of the home may additionally or alternatively define whether children 320 and 324 may access application programs and/or media content items of a particular category or class.

Figure 4:
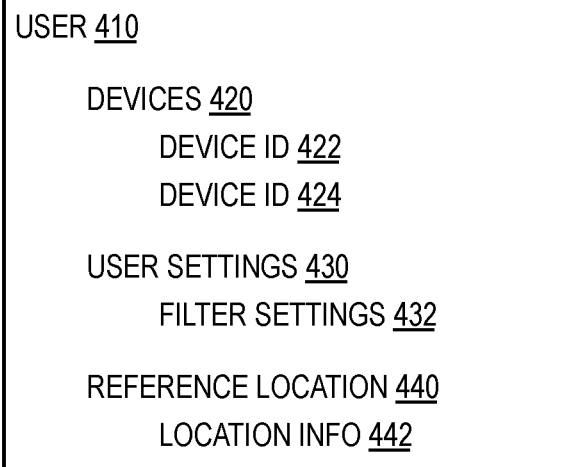
FIGS. 4 and 5 are schematic diagrams depicting example data structures according to disclosed embodiments.
Figure 5:
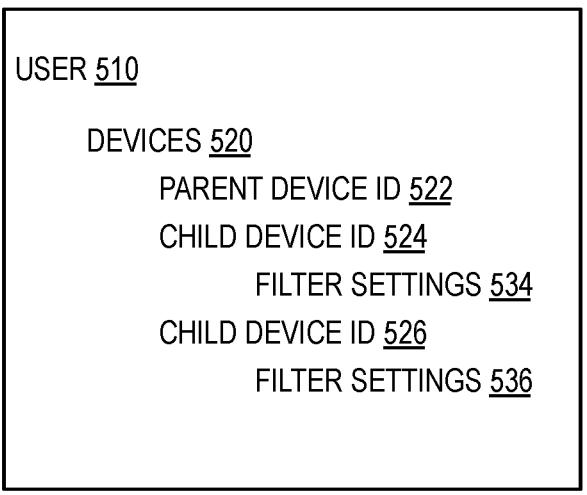

FIGS. 4 and 5 are schematic diagrams depicting example data structures as may be used in combination with the disclosed application program and/or media content filtering techniques described herein. In FIG. 4, devices 420 are associated with a user account 410 and are represented by device identifiers 412 and 414. In this implementation, application filtering may be performed on any or each of the devices responsive to proximity between those devices, or between a subject device and a reference location 440 indicated by location information 442. User settings 430 are also associated with user account 410, including filter settings 432. Filter settings 432 may be defined by a user or users having access to user account 410, and may be based on a hierarchical account structure involving a primary user account and one or more secondary user accounts. Filtering settings are applied to the online storefront to determine which application programs and/or media content items are accessible or inaccessible responsive to presence or proximity between devices or a device and reference location. Within FIG. 4, a user may designate one or more of devices 420 as the subject computing device with regards to the reference location 440.

In FIG. 5, devices 520 are also associated with a user account 510 and are represented by device identifiers 522, 524, and 526. The data structure of FIG. 5 may be used in combination with the data structure of FIG. 4. Within FIG. 5, a device identifier 522 may take the form of a parent device identifier (e.g., a subject computing device) or primary user account, and device identifiers 524 and 526 may take the form of child device identifiers (e.g., reference computing devices) or secondary user accounts. The child device identifiers or secondary user accounts may be associated with respective filter settings 534 and 536 specific to those devices or secondary user accounts, enabling different filter settings to be associated with each child device or secondary user account. In this implementation, application program filtering may be applied to child devices or secondary user accounts, but not to parent devices or primary user accounts in contrast to example aspects of FIG. 4 in which filtering may be applied to each device or to each account. The information contained within these data structures may be altered, updated, or provided by a user via a graphical user interface, whereby such information may be stored in a data store locally at the client device and/or remotely at the servers system.

The methods, processes, and operations described herein may be performed by one or more logic subsystems of one or more computing devices executing instructions. A logic subsystem may include one or more processors and/or logic elements that execute such instructions and user commands. Instructions may be stored in a storage subsystem from which a logic subsystem may access and execute those instructions. The storage subsystem includes one or more physical storage devices that include non-transitory storage elements that provide non-transitory storage. The instructions implementing the methods, processes, and operations or portions thereof described herein may take a variety of different forms and may depend on the type of computing device or computing system that executes the instructions.

For example, in the context of a client device, the instructions may take the form of an application program such as a web browser or an online storefront browser, may form part of an operating system of the client device, and/or may take the form of firmware. An application program may be general-purpose such as in the case of a web browser, or may be special-purpose such as in the case of an online storefront browser.

As another example, in the context of a server system, the instructions may include server-based applications, operating systems, and/or firmware. Server-side instructions may take the form of one or more instruction sets or modules. These modules may reside at one or more server devices of the server system. For example, one module may take the form of a filter module that filters application programs based on filter settings, and another module may take the form of a presence and/or proximity detection module that determines whether two or more devices are located at the same or similar location, or whether a device is located at or proximate to a reference location. This description of modules may also be applicable to client-side instructions as previously described.

Referring again to FIG. 1, client device 110 includes storage subsystem 112 holding instructions 116 and a data store 114. Client device 110 includes a logic subsystem 118 that executes instructions 116, and retrieves and stores information at data store 114. Client device 110 further includes a communication subsystem 120 that supports wired and/or wireless communication using any suitable communication protocol or number of communication protocols. Non-limiting examples of communication protocols supported by client device 110 include 4G LTE, 3G Wi-Fi, Bluetooth, or other suitable protocol. In the context of Bluetooth or other near-field communication protocol, communications between client device 110 and 130 may be direct rather than via an access point such as access point 162 when using other communication protocols such as LTE or Wi-Fi. Input/output subsystem 122 may include or may be configured to interface with one or more input and/or output device such as a graphical display, a touch-sensitive graphical display, a keyboard or keypad, a pointing device such as a mouse or controller, a microphone, an audio speaker, inertial sensors, gyroscopes, or other suitable devices.

Client devices 130 and/or 144 may include similar subsystems as previously described client device 110, including storage subsystem 132 holding instructions 136 and data store 134, a logic subsystem 138, communications subsystem 140, and input/output subsystem 142 with respect to client device 130.

Server system 150 may include one or more server devices that each include or collectively include a logic subsystem 159 and a storage subsystem 152. Storage subsystem 152 includes storefront 154, instructions 156, and data store 158. As previously described with reference to client device 110, a logic subsystem such as logic subsystem 159 executes instructions 156, and retrieves and stores information at data store 158. Logic subsystem 159 may also receive, processes, and respond to requests to access application programs and/or media content items of online storefront 154. Aspects of online storefront 154 may include or may be implemented through instructions 156. Storefront 154 may be a public storefront, in some examples, from which members of the general public may download and/or purchase application programs and/or media content items. In other examples, storefront 154 may be a private storefront from which members of a family, group, or organization may post and/or retrieve application programs without necessarily requiring purchase.

In view of the subject matter of the present disclosure, a method for a server system hosting an application program storefront accessible to computing devices via a communications network comprises: associating a first computing device with a second computing device; receiving a request initiated by the first computing device to the application program storefront via the communications network; detecting a proximity of the first computing device to the second computing device over one or more wireless communication links; responsive to the proximity detected between the first computing device and the second computing device being greater than a threshold, granting access to a limited set of application programs of the application program storefront and denying access to other application programs of the application program storefront for the first computing device initiating the request; and responsive to the proximity detected between the first computing device and the second computing device being less than the threshold, granting access to the limited set of application programs and granting access to one or more of the other application programs of the application program storefront for the first computing device initiating the request. In an example, detecting a proximity of the first computing device to the second computing device includes: receiving the request initiated by the first computing device via a wireless access point of the communications network; and detecting presence of the second computing device within wireless communication range of the wireless access point; wherein the proximity detected between the first computing device and the second computing device is greater than the threshold if the second computing device is not detected within wireless communication range of the wireless access point. In an example, the proximity detected between the first computing device and the second computing device is greater than the threshold if the second computing device is detected within wireless communication range of the wireless access point outside of a threshold time period to receiving the request or other communication from the first computing device; and proximity detected between the first computing device and the second computing device is less than the threshold if the second computing device is detected within wireless communication range of the wireless access point inside the threshold time period to receiving the request or other communication from the first computing device. In an example, detecting the proximity of the first computing device to the second computing device includes: obtaining first geo-location information for the first computing device; obtaining second geo-location information for the second computing device; and comparing the first geo-location information and the second geo-location information to determine a geographic proximity. In an example, detecting the proximity of the first computing device to the second computing device includes: obtaining first geo-location information for one of the first computing device or the second computing device; receiving communications from the other of the first computing device or the second computing device via a wireless access point; retrieving second geo-location information for the wireless access point; and comparing the first geo-location information and the second geo-location information to determine a geographic proximity. In an example, detecting the proximity of the first computing device to the second computing device includes: receiving communications from the first computing device via a wireless access point; and receiving communications from the second computing device via the wireless access point or a different wireless access point; wherein the proximity detected between the first computing device and the second computing device is greater than the threshold if the communications received from the second computing device are not received via the wireless point or if the communications are received from the second computing device via the different wireless access point. In an example, the method further comprises: applying a filter to the application program storefront to obtain the limited set of application programs to which the first computing device is granted access; wherein the filter is defined, at least in part, by a user associated with one or more of the first computing device and the second computing device. In an example, granting access includes enabling the first computing device to download an application program from the application program storefront via the communications network. In an example, denying access includes blocking download of the application program by the first computing device from the application program storefront. In an example, denying access includes enabling the first computing device to download the application program from the application program storefront via the communications network, and denying installation and/or launch of the application program at the first computing device. In an example, the method further comprises: initiating and/or enabling installation and/or launch of the application program at the first computing device upon the second computing device entering within the threshold of the first computing device based on an update to the detected proximity between the first computing device and the second computing device. In an example, the method further comprises: responsive to the request initiated by the first computing device to the application program storefront via the communications network, transmitting a selection of recommended application programs accessible to the first computing device from the application program storefront based on the proximity detected between the first computing device and the second computing device, and further based on a user profile attributed to the request, the user profile including an indication of social connectivity within a social network of other user profile's activity with respect to the application program storefront. In an example, the method further comprises: initiating a request for the location of the second computing device or initiating a communication to the second computing device; receiving a response to the request for the location or the communication that indicates a geographic location of the second computing device; and using geographic location to determine proximity of the second computing device to the first computing device. In an example, detecting the proximity of the first computing device to the second computing device includes: receiving an indication from the first computing device of whether presence of the second computing device has been detected via a direct near-field wireless link between the first computing device and the second computing device; wherein the proximity detected between the first computing device and the second computing device is less than the threshold only if presence of the second computing device is indicated.

In view of the subject matter of the present disclosure, a server system hosting an application program storefront accessible to computing devices via a communications network comprises: a logic subsystem to execute instructions; a storage subsystem having instructions stored thereon executable by the logic subsystem to: receive an indication of an association existing between a first computing device and a second computing device; receive a request initiated by the first computing device to the application program storefront via a wireless access point of the communications network; initiate detection of presence of the second computing device within wireless communication range of the wireless access point; responsive to presence of the second computing device not being detected within wireless communication range of the wireless access point, grant access to a limited set of application programs of the application program storefront and deny access to other application programs of the application program storefront for the first computing device initiating the request; and responsive to presence of the second computing device being detected within wireless communication range of the wireless access point, grant access to the limited set of application programs and grant access to one or more of the other application programs of the application program storefront for the first computing device initiating the request. In an example, the instructions are further executable to: log a time at which presence of the second computing device was detected within wireless communication range of the wireless access point; compare a time logged for the second computing device to a time that the request was received from the first computing device; responsive to presence of the second computing device being detected within wireless communication range of the wireless access point and a time difference between the time logged for the second computing device and the time that the request was received being greater than a threshold period, grant access to the limited set of application programs of the application program storefront and deny access to other application programs of the application program storefront for the first computing device initiating the request; and responsive to presence of the second computing device being detected within wireless communication range of the wireless access point and a time difference between the time logged for the second computing device and the time that the request was received being less than the threshold period, grant access to the limited set of application programs and grant access to one or more of the other application programs of the application program storefront for the first computing device initiating the request. In an example, the instructions are further executable to: detect presence of the second computing device by: sending a communication to the second computing device responsive to receiving the request from the first computing device; or sending a location query to a network device for location information for the second computing device responsive to receiving the request from the first computing device. In an example, the instructions are further executable to: associate the limited set of application programs with a first identifier; associate the other application programs with a second identifier; and initiate detection of presence of the second computing device within wireless communication range of the wireless access point only if the request received from the first computing device was directed at the other application programs associated with the second identifier.

In view of the subject matter of the present disclosure, a method for a computing device comprises: storing an association between the computing device and a second computing device in a data store of the computing device; transmitting a request from the computing device to access an application program storefront hosted by a server system via a communications network, the request indicating whether presence of the second computing device has been detected via a direct near-field wireless link between the computing device and the second computing device; receiving a response from the server system, the response including application program information, such that: if the request did not indicate presence of the second computing device, the application program information includes a limited set of application programs of the application program storefront, if the request indicated presence of the second computing device, the application program information includes an expanded set of application programs of the application program storefront; and rendering the application program information at a graphical display, the application program information enabling a user to select an application program for purchase and download. In an example, storing the association is performed responsive to a user initiating a device association operation at the computing device; and transmitting the request is performed responsive to a user launching a browser application at the computing device for accessing the application program storefront hosted at the server system.

It should be understood that the embodiments, implementations, and scenarios described by way of example herein are illustrative and not restrictive. The scope of the invention or inventions is defined by the claims rather than by these examples. All changes that fall within the metes and bounds of the claims, and the equivalence of such metes and bounds are embraced by the claims.

The invention claimed is:

1. A method for a server system hosting a media content storefront for audio and/or video content items accessible to computing devices via a communications network, the method comprising:
    associating a first computing device with a second computing device;
    receiving a request initiated by the first computing device to the media content storefront via the communications network;
    detecting a proximity of the first computing device to the second computing device over one or more wireless communication links;
    responsive to the proximity detected between the first computing device and the second computing device being greater than a threshold, granting access to a limited set of audio and/or video content items of the media content storefront and denying access to other audio and/or video content items of the media content storefront for the first computing device initiating the request; and
    responsive to the proximity detected between the first computing device and the second computing device being less than the threshold, granting access to the limited set of audio and/or video content items and granting access to one or more of the other audio and/or video content items of the media content storefront for the first computing device initiating the request.

2. The method of claim 1, wherein detecting a proximity of the first computing device to the second computing device includes:
    receiving the request initiated by the first computing device via a wireless access point of the communications network; and
    detecting presence of the second computing device within wireless communication range of the wireless access point;
    wherein the proximity detected between the first computing device and the second computing device is greater than the threshold if the second computing device is not detected within wireless communication range of the wireless access point.

3. The method of claim 2, wherein the proximity detected between the first computing device and the second computing device is greater than the threshold if the second computing device is detected within wireless communication range of the wireless access point outside of a threshold time period to receiving the request or other communication from the first computing device; and
    wherein proximity detected between the first computing device and the second computing device is less than the threshold if the second computing device is detected within wireless communication range of the wireless access point inside the threshold time period to receiving the request or other communication from the first computing device.

4. The method of claim 1, wherein detecting the proximity of the first computing device to the second computing device includes:
    obtaining first geo-location information for the first computing device; obtaining second geo-location information for the second computing device; and
    comparing the first geo-location information and the second geo-location information to determine a geographic proximity.

5. The method of claim 1, wherein detecting the proximity of the first computing device to the second computing device includes:
    obtaining first geo-location information for one of the first computing device or the second computing device;
    receiving communications from the other of the first computing device or the second computing device via a wireless access point;
    retrieving second geo-location information for the wireless access point; and
    comparing the first geo-location information and the second geo-location information to determine a geographic proximity.

6. The method of claim 1, wherein detecting the proximity of the first computing device to the second computing device includes:
    receiving communications from the first computing device via a wireless access point; and receiving communications from the second computing device via the wireless access point or a different wireless access point;
    wherein the proximity detected between the first computing device and the second computing device is greater than the threshold if the communications received from the second computing device are not received via the wireless point or if the communications are received from the second computing device via the different wireless access point.

7. The method of claim 1, further comprising:
    applying a filter to the media content storefront to obtain the limited set of audio and/or video content items to which the first computing device is granted access;
    wherein the filter is defined, at least in part, by a user associated with one or more of the first computing device and the second computing device.

8. The method of claim 1, wherein granting access includes enabling the first computing device to download an audio and/or video content item from the media content storefront via the communications network.

9. The method of claim 8, wherein denying access includes blocking download of the audio and/or video content item by the first computing device from the media content storefront.

10. The method of claim 8, wherein denying access includes enabling the first computing device to download the audio and/or video content item from the media content storefront via the communications network, and denying presentation of the audio and/or video content item at the first computing device.

11. The method of claim 10, further comprising: initiating and/or enabling presentation of the audio and/or video content item at the first computing device upon the second computing device entering within the threshold of the first computing device based on an update to the detected proximity between the first computing device and the second computing device.

12. The method of claim 1, further comprising:
responsive to the request initiated by the first computing device to the media content storefront via the communications network, transmitting a selection of recommended audio and/or video content items accessible to the first computing device from the media content storefront based on the proximity detected between the first computing device and the second computing device, and further based on a user profile attributed to the request, the user profile including an indication of social connectivity within a social network of other user profile's activity with respect to the media content storefront.

13. The method of claim 1, further comprising:
initiating a request for the location of the second computing device or initiating a communication to the second computing device;
receiving a response to the request for the location or the communication that indicates a geographic location of the second computing device; and
using geographic location to determine proximity of the second computing device to the first computing device.

14. The method of claim 1, wherein detecting the proximity of the first computing device to the second computing device includes:
receiving an indication from the first computing device of whether presence of the second computing device has been detected via a direct near-field wireless link between the first computing device and the second computing device;
wherein the proximity detected between the first computing device and the second computing device is less than the threshold only if presence of the second computing device is indicated.

15. A server system hosting the media content storefront accessible to computing devices via a communications network, the server system comprising:
a logic subsystem to execute instructions;
a storage subsystem having instructions stored thereon executable by the logic subsystem to:
receive an indication of an association existing between a first computing device and a second computing device;
receive a request initiated by the first computing device to the media content storefront via a wireless access point of the communications network;
initiate detection of presence of the second computing device within wireless communication range of the wireless access point;
responsive to presence of the second computing device not being detected within wireless communication range of the wireless access point, grant access to a limited set of audio and/or video content items of the media content storefront and deny access to other audio and/or video content items of the media content storefront for the first computing device initiating the request; and
responsive to presence of the second computing device being detected within wireless communication range of the wireless access point, grant access to the limited set of audio and/or video content items and grant access to one or more of the other audio and/or video content items of the media content storefront for the first computing device initiating the request.

16. The server system of claim 15, wherein the instructions are further executable to:
log a time at which presence of the second computing device was detected within wireless communication range of the wireless access point;
compare a time logged for the second computing device to a time that the request was received from the first computing device;
responsive to presence of the second computing device being detected within wireless communication range of the wireless access point and a time difference between the time logged for the second computing device and the time that the request was received being greater than a threshold period, grant access to the limited set of audio and/or video content items of the media content storefront and deny access to other audio and/or video content items of the media content storefront for the first computing device initiating the request; and
responsive to presence of the second computing device being detected within wireless communication range of the wireless access point and a time difference between the time logged for the second computing device and the time that the request was received being less than the threshold period, grant access to the limited set of audio and/or video content items and grant access to one or more of the other audio and/or video content items of the media content storefront for the first computing device initiating the request.

17. The server system of claim 16, wherein the instructions are further executable to:
detect presence of the second computing device by:
sending a communication to the second computing device responsive to receiving the request from the first computing device; or
sending a location query to a network device for location information for the second computing device responsive to receiving the request from the first computing device.

18. The server system of claim 17, wherein the instructions are further executable to:
associate the limited set of audio and/or video content items with a first identifier;
associate the other audio and/or video content items with a second identifier; and
initiate detection of presence of the second computing device within wireless communication range of the wireless access point only if the request received from the first computing device was directed at the other audio and/or video content items associated with the second identifier.

19. A method for a computing device, the method comprising:
storing an association between the computing device and a second computing device in a data store of the computing device;
transmitting a request from the computing device to access the media content storefront hosted by a server system via a communications network, the request indicating whether presence of the second computing device has been detected via a direct near-field wireless link between the computing device and the second computing device;
receiving a response from the server system, the response including audio and/or video content item information, such that:
if the request did not indicate presence of the second computing device, the audio and/or video content item information includes a limited set of audio and/or video content items of the media content storefront,
if the request indicated presence of the second computing device, the audio and/or video content item information includes an expanded set of audio and/or video content items of the media content storefront; and rendering the audio and/or video content item information at a graphical display, the audio and/or video content item information enabling a user to select an audio and/or video content item for purchase and download.

20. The method of claim 19, wherein storing the association is performed responsive to a user initiating a device association operation at the computing device; and
wherein transmitting the request is performed responsive to a user launching a browser application at the computing device for accessing the media content storefront hosted at the server system.

* * * * *